ns in the female member provides a biasing force to hold the apertured parts in contact. Alternative embodiments of the invention permit easy separation of the male and female members.

United States Patent
Wilson

[11] 3,910,155
[45] Oct. 7, 1975

[54] JAM TOGETHER FASTENER
[76] Inventor: Leroy Wilson, P.O. Box 203, Manhattan, Kans. 66502
[22] Filed: Oct. 24, 1973
[21] Appl. No.: 409,184

[52] U.S. Cl.......................................... 85/70; 85/4
[51] Int. Cl.² ......................................... F16B 19/00
[58] Field of Search .............. 85/DIG. 2, 77, 70, 39, 85/4, 78, 82, 83, 80, 81; 24/90 PR, 216, 217, 73 HS

[56] References Cited
UNITED STATES PATENTS

| 192,636 | 7/1877 | Collins et al. | 151/19 R |
|---|---|---|---|
| 2,451,356 | 10/1948 | Rechton | 85/82 |
| 3,069,962 | 12/1962 | Rapada | 85/82 |
| 3,152,376 | 10/1964 | Boser et al. | 24/216 |
| 3,213,507 | 10/1965 | Christian et al. | 24/217 |
| 3,262,168 | 7/1966 | Overhoff | 85/82 |
| 3,262,352 | 7/1966 | Bedford | 85/70 |
| 3,534,936 | 10/1970 | Knowlton | 85/70 |

FOREIGN PATENTS OR APPLICATIONS

| 92,613 | 4/1967 | France | 24/90 PR |

Primary Examiner—Edward C. Allen
Attorney, Agent, or Firm—Lowe, Kokjer, Kircher, Wharton & Bowman

[57] ABSTRACT

A wedging-type fastener for securing apertured parts together. A rigid flanged male member is jammed through the bore of a resilient female member to be grippingly retained in a fastening position. Resulting deformation in the female member provides a biasing force to hold the apertured parts in contact. Alternative embodiments of the invention permit easy separation of the male and female members.

3 Claims, 9 Drawing Figures

JAM TOGETHER FASTENER

BACKGROUND AND SUMMARY OF THE INVENTION

This invention relates to fastening assemblies for securely holding apertured parts together and more particularly to fastening assemblies including resilient female elements and rigid male elements.

During construction and repair work, the problem of fastening together two or more relatively thin articles, such as metal sheets, wooden boards, or plastic slabs, is frequently encountered. Of course, there are many existing devices for performing the fastening function, but most of these devices utilize hard metal fasteners, such as conventional nuts and bolts, which are apt to mar or deform the objects to be fastened. If the objects are soft or susceptible to being scratched, hard metal fasteners are highly undesirable for use in fastening them together. Furthermore, when it is necessary to electrically or thermally insulate the fastener from the fastened articles, conventional metal fasteners cannot be employed. Constructing conventional fasteners of a softer material has proven impractical, resulting in unsatisfactory performance from a strength standpoint and high production costs from an economy standpoint. Moreover, existing fasteners are often cumbersome and time consuming to attach, and many are not removable to permit the separation of the fastened articles.

Consequently, there is a need for a fastening assembly which not only permits quick and simple attachment, but which also effectively insulates the fastened objects from contact with any hard surfaces of the fastener. It is a primary goal of this invention to provide such a fastener.

More specifically, an object of this invention is to provide a fastening assembly for securing together two or more articles that will not scratch or mar the articles. This feature is achieved by utilizing a relatively soft female member for contact with the article surfaces to cushioningly shield such surfaces from a rigid male member.

Another object of the invention is to provide a fastening assembly of the character described that may be quickly and easily attached to the articles to be fastened.

Still another object of the invention is to provide a fastening assembly of the character described that effectively insulates, both electrically and thermally, the articles to be fastened from the metal part of the fastener.

Yet another object of the invention is to provide a fastening assembly of the character described that prevents axial movement of the articles as the fastener is attached thereto. This desirable feature is achieved by providing a grommet-type flange upon which the articles are seated during the fastening operation.

A further object of the invention is to provide a fastener of the character described wherein the fastener may be easily removed to permit separation of the fastened articles.

Other and further object of the invention, together with the features of novelty appurtenant thereto, will appear in the course of the following description.

DESCRIPTION OF THE DRAWING

In the accompanying drawing, which forms a part of the specification and is to be read in conjunction therewith, and in which like reference numerals are employed to indicate like parts in the various views.

Figure 1:
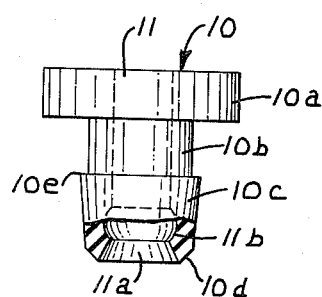
FIG. 1 is an elevational, partially sectional view of a preferred embodiment of the female member of the fastener, with broken lines indicating the contour of the axial bore.
Figure 2:
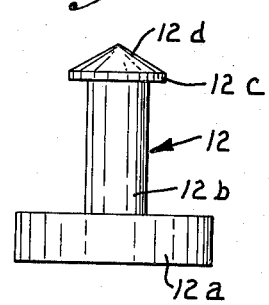
FIG. 2 is an elevational view of a first embodiment of of the male member adapted for use with a female member of the fastener assembly herein taught.

Referring now to the drawing in greater detail, the resilient female member or nut of the fastening assembly, generally designated by the numeral 10 is constructed of a strong deformable substance such as rubber, nylon, or a similar synthetic product possessing adequate strength and resiliency. Female member 10 contains a longitudinal axial bore 11 therethrough being substantially cylindrical throughout a greater length and terminating at the end (lower end in FIG. 1) with a countersink 11a. Integrally adjacent the countersink 11a and preferably enlarged relative to the rest of bore 11 is a protuberant recess 11b. Female member 10 comprises a radially extending flanged head 10a surmounting a barrel portion 10b of substantially the same diameter as the hole through the pieces to be secured together and of substantially the same length as the combined thickness of the pieces secured. The lower end of the barrel 10b is joined to an inwardly tapering conical portion 10c which interiorly forms the protuberant recess 11b and countersink 11a. The extreme lower surface 10d preferably tapers more sharply than the rest of the conical portion 10c to provide a terminal edge of less diameter than the size of the barrel 10b. The upper region of the conical portion 10c forms a shoulder 10e integral with the barrel 10b but having a slightly larger diameter.

The numeral 12 generally designates a first embodiment of the male member or stud of the fastening assembly. All embodiments of the male member are preferably constructed of a hard, rigid material such as a metal or a strong synthetic. Male member 12 comprises a flanged head 12a and an integral central shank 12b of substantially the same diameter as the bore 11 of the female member and slightly lesser in length than the overall length of the female member. The shank 12b terminates in a cone-shaped tip 12d having a shoulder 12c immediately adjacent the shank. Shoulder 12c is slightly larger than the diameter of the shank 12d but is smaller than the size of the hole through the pieces to be secured.

Figure 5:
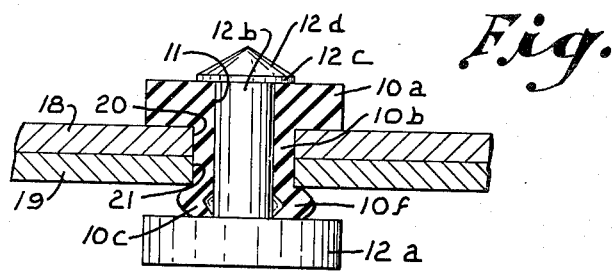
FIG. 5 is a sectional view of the female member of the fastener with the first embodiment of the male member applied in a fastening position to join two sheet panels.

To fasten together two articles, such as the metal sheets 18 and 19 of FIG. 5, each of the panels is first bored with a hole approximately corresponding to the size of the barrel 10b of the female member 10. Female member 10 is insertably pushed, aided by the lower taper 10d and the taper of the conical portion 10c into holes 20 and 21 until flanged head 10a engages metal sheet 18, thereupon the resilient shoulder 10e springs out to catchably engage sheet 19. Thus female member 10 provides a grommet within the holes through the metal sheets, the sheets 18 and 19 being held in position between shoulder 10e and the larger flange 10a throughout the fastening operation.

Tip 12d of the male member 12 is inserted into the countersink 11a and wedged through the bore 11, facilitated by the resiliency of the female 10, until the underside of the shoulder 12c catches the outside face of the flanged head 10a. Since shank 12b is shorter than female member 10, the female member is forced to deform when the male member is jammed through bore 11. Because sleeve 10c is the portion of female member 10 most susceptible to deformation, the pressure of flanged head 12a thereupon causes sleeve 10c to bow outwardly, forming a radially extending bulge 10f. The general taper of sleeve 10c and the cupped recess 11b assure that the deformation occurs as described. Sheets 18 and 19 are thus securely locked between flanged head 10a and bulge 10f of the female member 10.

Figure 3:
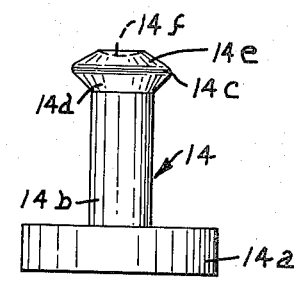
FIG. 3 is an elevational view of a second embodiment of the male member adapted for use with a female member of the fastener assembly.
Figure 6:
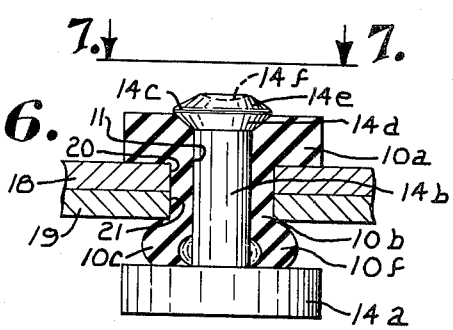
FIG. 6 is a sectional view (similar to that of FIG. 5) showing application of the second embodiment of the male member in the fastened position.
Figure 9:
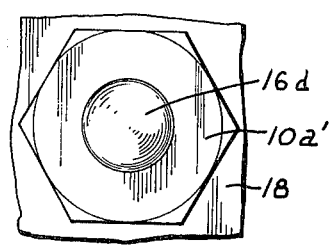
FIG. 9 is a top plan view taken generally along line 9—9 of FIG. 8 in the direction of the arrows.
Figure 7:
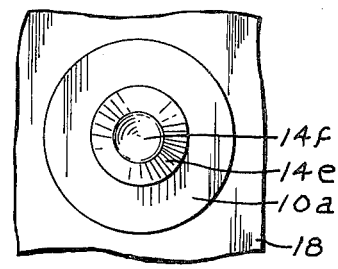
FIG. 7 is a top plan view taken generally along line 7—7 of FIG. 6 in the direction of the arrows.

In a second embodiment of the male member, designated by the numeral 14, and as shown in FIGS. 3, 6, and 7, has a flanged head 14a and a shank 14b identical to flanged head 12a and shank 12b of the first embodiment of the male member 12. However, unlike male member 12, male member 14 is removable from the bore 11 of female member 10. Accordingly, a transition taper portion 14d is connected to shoulder 14c and is uniformly downwardly tapered to the shank 14b. Further, upper portion 14e, which gradually tapers away from shoulder 14c, is provided with a central dished depression 14f, which is adapted to receive the tip of a conventional punch.

To fasten together the two articles with the assembly of male member 14 and female member 10, a procedure identical to that previously described in conjunction with male member 12 is followed. In the applied position, as illustrated in FIG. 6, the shoulder 14c substantially corresponds to the exterior face of the flanged female head 10a. Male member 14 may be disengaged from female member 10 by placing the tip of a conventional punch in depression 14f and striking the end of the punch with a hammer to drive the male member from bore 11, inwardly tapering portion 14d permitting such disengagement without damage to the female member 10. The assembly may then be reused in a subsequent fastening operation.

Figure 4:
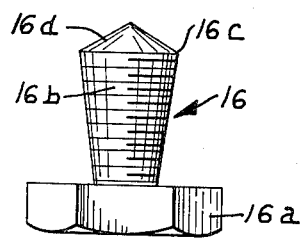
FIG. 4 is an elevational view of a third embodiment of the male member adapted for use with a female member of the fastener assembly.

FIG. 4 illustrates the nature of the third embodiment of the male member, which is designated by the numeral 16. Male member 16 includes a hexagonal flange head 16a which may be easily engaged with a conventional wrench. Shank 16b is threaded throughout its length and gradually and increasingly tapers from head 16a and terminates at a shoulder edge 16c surmounted by a conical tip 16d. Through a major portion of its length the shank 16b is greater in diameter than the size of the female bore 11, but is always smaller in size than the outside diameter of the barrel 10b. It should be noted that the female member 10 utilized with male member 16 is identical in construction to that previously described but preferably has a hexagonal flange head 10a' (FIG. 8) to facilitate engagement with a wrench.

Figure 8:
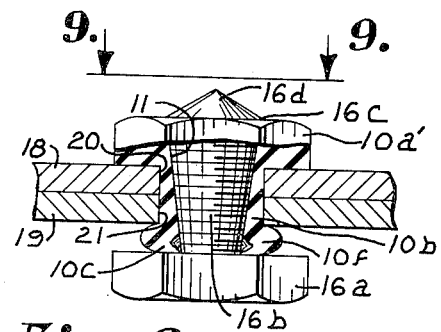
FIG. 8 is a sectional view of a second embodiment of the female member with the third embodiment of the male member applied in a fastening position to join two sheet panels.

To fasten together with metal sheets 18 and 19 of FIG. 8 with the assembly of male member 16 and modified female member 10 (head 10a' being hexagonal), female member 10 is first extended into apertures 20 and 21 as previously described. Conical tip 16d is wedged into countersink 11a and the recess 11b. Thereafter, with the female member in compression, the male member may be inserted through the bore 11 by rotatably turning the male with the aid of a wrench until the shoulder edge 16c approximately coincides with the upper face of the female flange 10a'. The compressive force thus exerted upon shank 16b by the deformed resilient material which grips the threads of the shank firmly maintains male member 16 in the jammed fastening position to secure sheets 18 and 19 together between flanged head 10a' and the buckled portion 10f. To disengage male member 16 from female member 10, hexagonal heads 10a' and 12a are grasped with conventional tools, such as wrenches, and rotated in the proper direction relative to one another, the spiral threads of the shank 16b causing withdrawal of the male member from bore 11. The assembly is then capable of reuse in a subsequent fastening operation.

From the foregoing it will be understood that this invention is one well adapted to attain all the ends and objects hereinabove set forth, together with other advantages which are obvious and which are inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth, or shown in the accompanying drawings is to be interpreted as illustrative and not in a limiting sense.

Having thus described my invention, I claim:

1. An assembly for fastening apertured parts together in abutting relation, said apertured parts having a uniformly alignable circular hole therethrough, said assembly comprising:

a resilient female member containing a longitudinal bore therethrough and including a head of larger size than said hole of the apertured parts, a cylindrical sleeve being substantially equal in diameter and length to the respective diameter and length of said circular hole of the apertured parts, and a deformable terminal flange of greater size than said sleeve and integrally joined thereto and including a bore portion formed as a protuberant recess; and a rigid male member including a head of larger size than said hole of the apertured parts and a shank joined to said head being shorter in length than said female member and substantially equal to the size of said longitudinal bore of the female member, said shank terminating opposite said male head in an end portion greater in size than said female bore, smaller in size than said hole of the apertured parts, and substantially symmetrical about the axis of said male shank;

whereby said terminal flange and sleeve of the female member may be inserted through said hole with the head of the female member engaging one of said apertured parts and the terminal flange engaging the other of said apertured parts, with said sleeve disposed within the hole therethrough, and said end portion and shank of the male member may be forced through said bore of the female member for said female head to grippingly hold said male end portion, while compressive force of the male head causes said female terminal flange to buckle radially outwardly forming a bulge to firmly secure said apertured parts together in abutting relation between said bulge and said female head with said female member insulating said male member from contact with said apertured parts.

2. The assembly as in claim 1, said male end portion having a dished depression centrally therein.

3. An assembly for fastening apertured parts together in abutting relation, said apertured parts having a uniformly alignable circular hole therethrough, said assembly comprising:

a resilient female member containing a longitudinal bore therethrough and including a head of larger size than said hole of the apertured parts, a cylindrical sleeve being substantially equal in diameter and length to the respective diameter and length of said circular hole of the apertured parts, and a deformable terminal flange of greater size than said sleeve and integrally joined thereto and including a bore portion formed as a protuberant recess and a rigid male member including a head of larger size than said hole of the apertured parts and a threaded shank joined to said head being shorter in length than said female member and being circular in cross-section, said shank tapering outwardly from said head to an outer end portion, the portion of said shank immediately adjacent said head being substantially equal to the size of said longitudinal bore of the female member and the end portion of said shank remote from said head being greater in size than said female bore and smaller in size than said hole of the apertured parts;

whereby said terminal flange and sleeve of the female member may be inserted through said hole with the head of the female member engaging one of said apertured parts and the terminal flange engaging the other of said apertured parts, with said sleeve disposed within the hole therethrough, and said end portion and shank of the male member may be forced through said bore of the female member for said female head to grippingly hold said male end portion, while compressive force of the male head causes said female terminal flange to buckle radially outwardly forming a bulge to firmly secure said apertured parts together in abutting relation between said bulge and said female head with said female member insulating said male member from contact with said apertured parts.

* * * * *